(12) United States Patent
Lu et al.

(10) Patent No.: US 12,114,055 B2
(45) Date of Patent: Oct. 8, 2024

(54) CAMERA MODULE AND ELECTRONIC DEVICE SUPPORTING ANTI-SHAKE AND LARGER FIELD OF VIEW FOR SHOOTING

(71) Applicant: VIVO MOBILE COMMUNICATION CO., LTD., Guangdong (CN)

(72) Inventors: Lianpeng Lu, Guangdong (CN); Lijun Zhu, Guangdong (CN); Hao Jing, Guangdong (CN); Xianlong Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 72 days.

(21) Appl. No.: 17/707,402

(22) Filed: Mar. 29, 2022

(65) Prior Publication Data

US 2022/0224807 A1  Jul. 14, 2022

Related U.S. Application Data

(63) Continuation of application No. PCT/CN2020/117238, filed on Sep. 23, 2020.

(30) Foreign Application Priority Data

Sep. 30, 2019 (CN) .......................... 201910942344.7

(51) Int. Cl.
*H04N 23/54* (2023.01)
*H04N 23/51* (2023.01)
(Continued)

(52) U.S. Cl.
CPC ............. *H04N 23/54* (2023.01); *H04N 23/51* (2023.01); *H04N 23/55* (2023.01); *H04N 23/687* (2023.01)

(58) Field of Classification Search
CPC ........ H04N 23/51; H04N 23/54; H04N 23/55; H04N 23/687; H04N 23/685
See application file for complete search history.

(56) References Cited

U.S. PATENT DOCUMENTS 9,113,051 B1  8/2015 Scalisi
11,463,607 B2 * 10/2022 Moon ...................... G02B 7/08
(Continued)

FOREIGN PATENT DOCUMENTS

CN         2807646 Y      8/2006
CN        203745777 U     7/2014
(Continued)

OTHER PUBLICATIONS

First Office Action for Japanese Application No. 2022-519750, dated Mar. 28, 2023, 3 Pages.
(Continued)

*Primary Examiner* — Nicholas G Giles
(74) *Attorney, Agent, or Firm* — Brooks Kushman P.C.

(57) ABSTRACT

A camera module includes module housing, first bracket, camera, second bracket, rolling-element bracket; module housing has inner housing chamber, first bracket is at least partly in inner housing chamber, is hinged to module housing by first hinge shaft, and can rotate around first hinge shaft; camera is fixedly connected to second bracket, rolling-element bracket is disposed with rolling element, second bracket is connected to rolling element in rolling mode, camera can rotate with second bracket around its lens axis, rolling-element bracket is hinged to first bracket by second hinge shaft, camera and second bracket can rotate with rolling-element bracket around second hinge shaft; axes of first and second hinge shafts intersect or lie on different planes, lens axis and axis of first hinge shaft intersect or lie on different planes, lens axis and axis of second hinge shaft
(Continued)

intersect or lie on different planes. An electronic device is provided.

18 Claims, 5 Drawing Sheets

(51) Int. Cl.
*H04N 23/55* (2023.01)
*H04N 23/68* (2023.01)

(56) References Cited

U.S. PATENT DOCUMENTS

| | | |
|---|---|---|
| 2008/0273092 A1 | 11/2008 | Chiou et al. |
| 2015/0201128 A1 | 7/2015 | Dong |
| 2017/0339346 A1 | 11/2017 | Chung et al. |
| 2019/0258144 A1 | 8/2019 | Strobert, Jr. et al. |
| 2020/0119869 A1 | 4/2020 | Taherzadeh et al. |
| 2021/0080621 A1 | 3/2021 | Lee |
| 2021/0218866 A1* | 7/2021 | Moon .................... H04N 23/51 |

FOREIGN PATENT DOCUMENTS

| | | |
|---|---|---|
| CN | 106713557 A | 5/2017 |
| CN | 107608050 A | 1/2018 |
| CN | 108696687 A | 10/2018 |
| CN | 110572556 A | 12/2019 |
| JP | 2002354082 A | 12/2002 |
| JP | 2019020525 A | 2/2019 |
| JP | 2021028656 A | 2/2021 |
| JP | 2021028657 A | 2/2021 |
| JP | 2021032930 A | 3/2021 |
| KR | 20190101904 A | 9/2019 |
| WO | 2021196148 A1 | 10/2021 |

OTHER PUBLICATIONS

First Office Action for Chinese Application No. 201910942344.7, dated Jul. 28, 2020, 7 Pages.
International Search Report and Written Opinion for Application No. PCT/CN2020/117238, dated Dec. 24, 2020, 8 Pages.
Extended European Search Report for Application No. 21837357.9, dated Oct. 16, 2023, 8 Pages.
First Office Action for Korean Application No. 10-2022-7011410, dated Oct. 18, 2023, 5 Pages.

* cited by examiner

CAMERA MODULE AND ELECTRONIC DEVICE SUPPORTING ANTI-SHAKE AND LARGER FIELD OF VIEW FOR SHOOTING

CROSS-REFERENCE TO RELATED APPLICATIONS

This application is a continuation application of International Application No. PCT/CN2020/117238 filed on Sep. 23, 2020, which claims priority to Chinese Patent Application No. 201910942344.7 filed on Sep. 30, 2019, which are incorporated herein by reference in their entireties.

TECHNICAL FIELD

This disclosure relates to the field of communications device technologies, and in particular, to a camera module and an electronic device.

BACKGROUND

With advancement of technologies, electronic devices (such as mobile phones and tablet computers) have been rapidly developed. As a powerful tool, an electronic device greatly facilitates life and work of users. Camera shooting is a basic function of the electronic device, which can meet user needs for shooting. Camera shooting is usually implemented by a camera module of the electronic device.

In a specific operation process, a user usually holds an electronic device to take pictures. Due to shaking in the hand-held process, quality of the pictures taken by the camera module is relatively poor.

SUMMARY

A camera module includes a module housing, a first bracket, a camera, a second bracket, and a rolling-element bracket, where the module housing has an inner housing chamber;

the first bracket is at least partly disposed in the inner housing chamber, the camera is at least partly disposed in the inner housing chamber, the first bracket is hinged to the module housing by a first hinge shaft, and the first bracket is able to rotate around the first hinge shaft;

the camera is fixedly connected to the second bracket, the rolling-element bracket is disposed with a rolling element, the second bracket is connected to the rolling element in a rolling mode, the camera is able to rotate with the second bracket around its lens axis, the rolling-element bracket is hinged to the first bracket by a second hinge shaft, and the camera and the second bracket is able to rotate with the rolling-element bracket around the second hinge shaft; and an axis of the first hinge shaft and an axis of the second hinge shaft intersect or lie on different planes, the lens axis and the axis of the first hinge shaft intersect or lie on different planes, and the lens axis and the axis of the second hinge shaft intersect or lie on different planes.

An electronic device includes the foregoing camera module.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the accompanying drawings.

Figure 1:
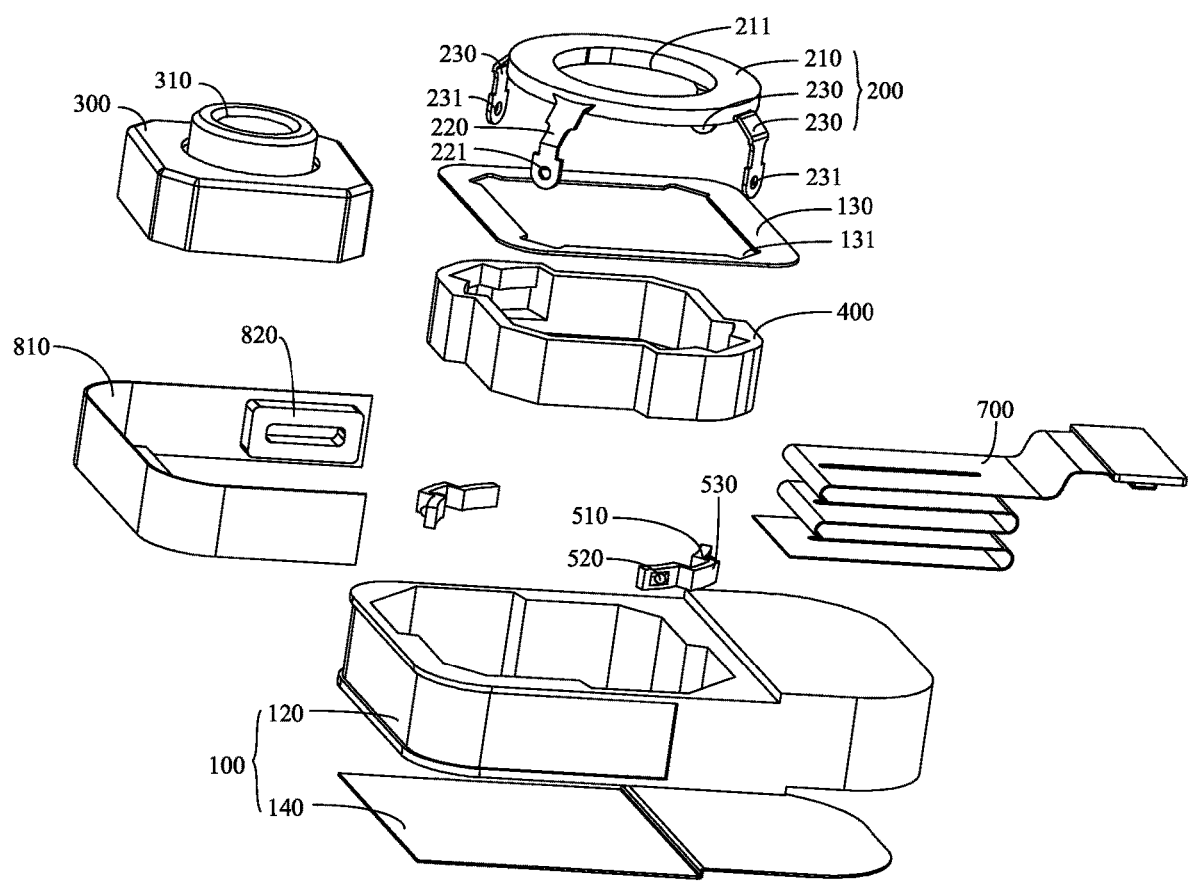
FIG. 1 is a schematic exploded view of a camera module disclosed in the embodiments of this disclosure.
Figure 2:
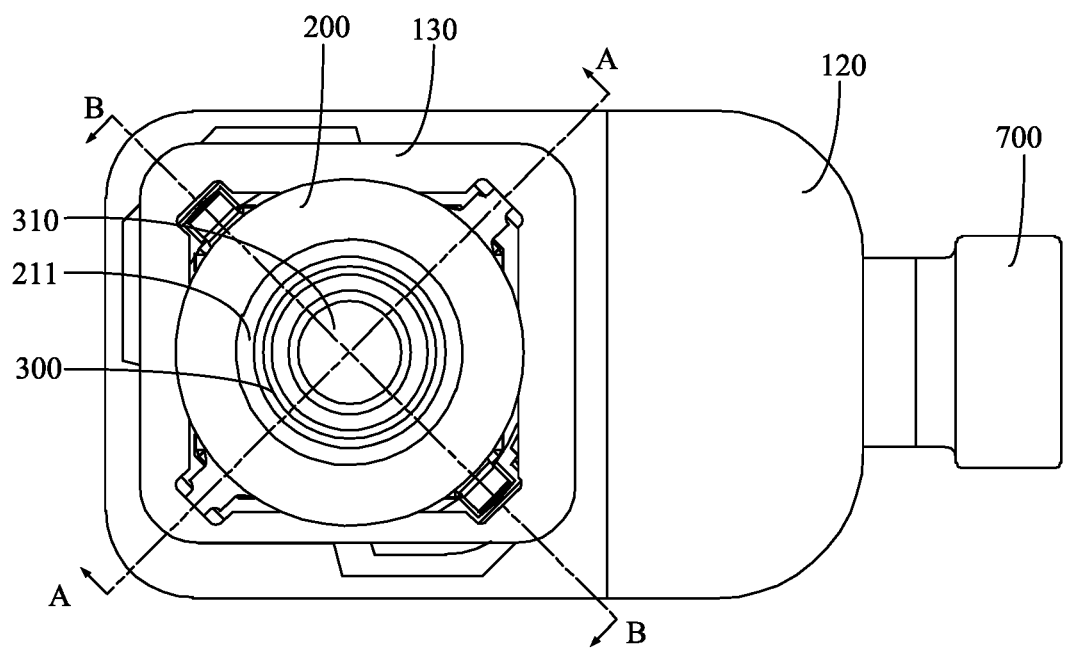
FIG. 2 is a schematic structural diagram of a camera module disclosed in the embodiments of this disclosure.
Figure 3:
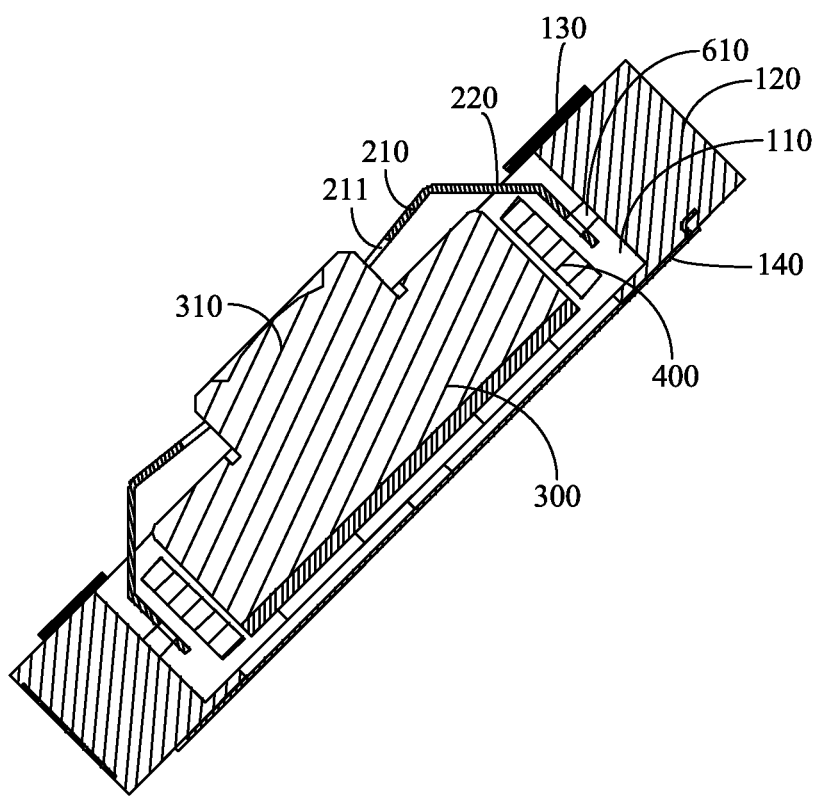
FIG. 3 is an A-A section view of FIG. 2.
Figure 4:
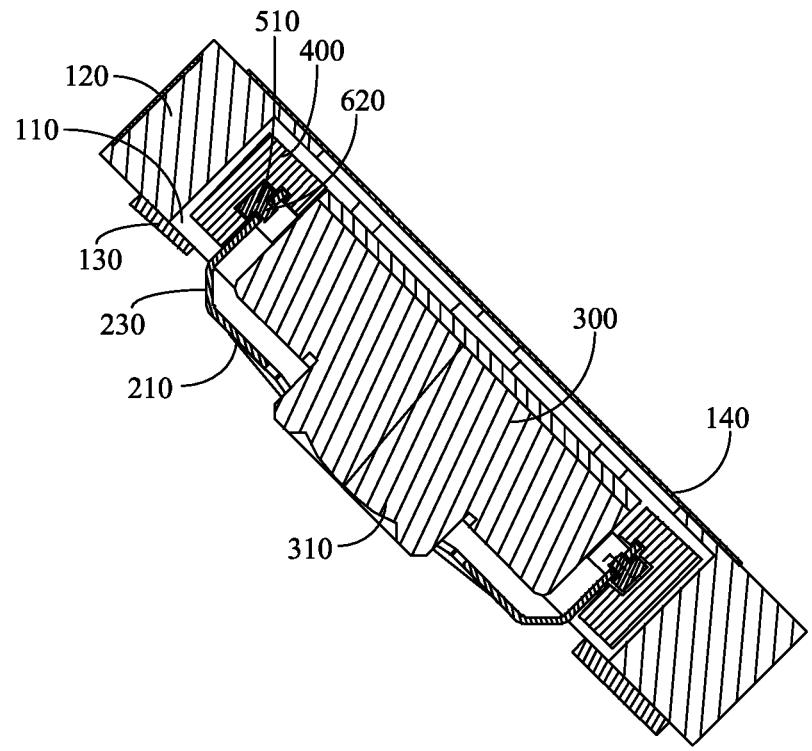
FIG. 4 is a B-B section view of FIG. 2.
Figure 5:
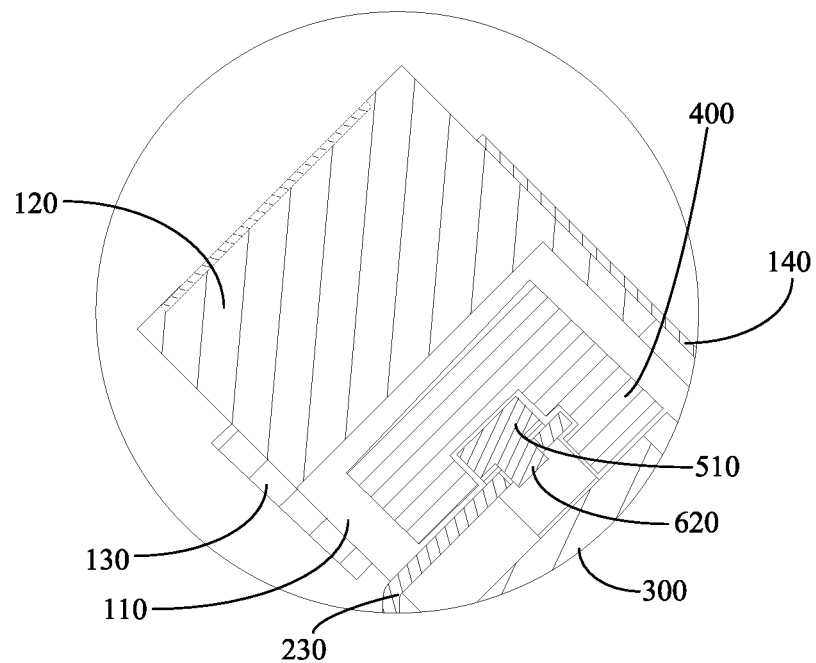
FIG. 5 is a partially enlarged diagram of FIG. 4.
Figure 6:
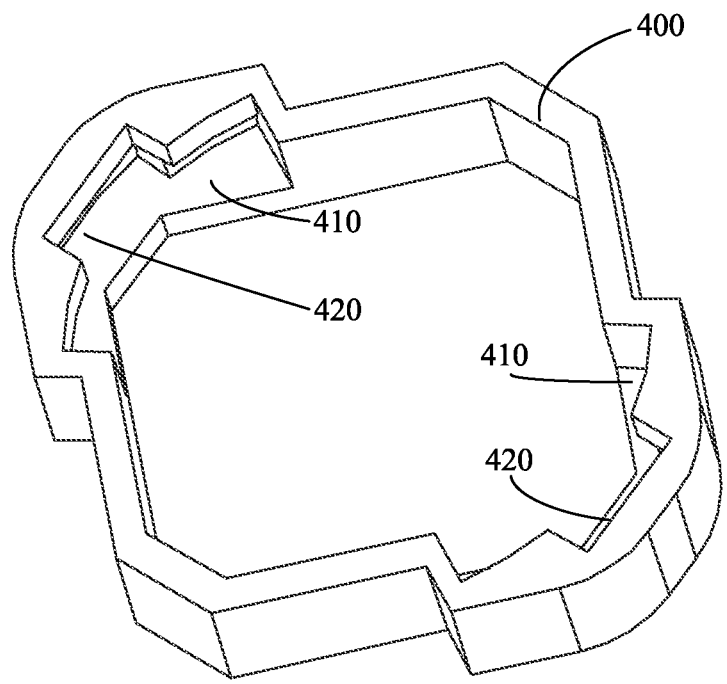
FIG. 6 and FIG. 7 are schematic structural diagrams of a camera module under different viewing angles disclosed in the embodiments of this disclosure.
Figure 7:
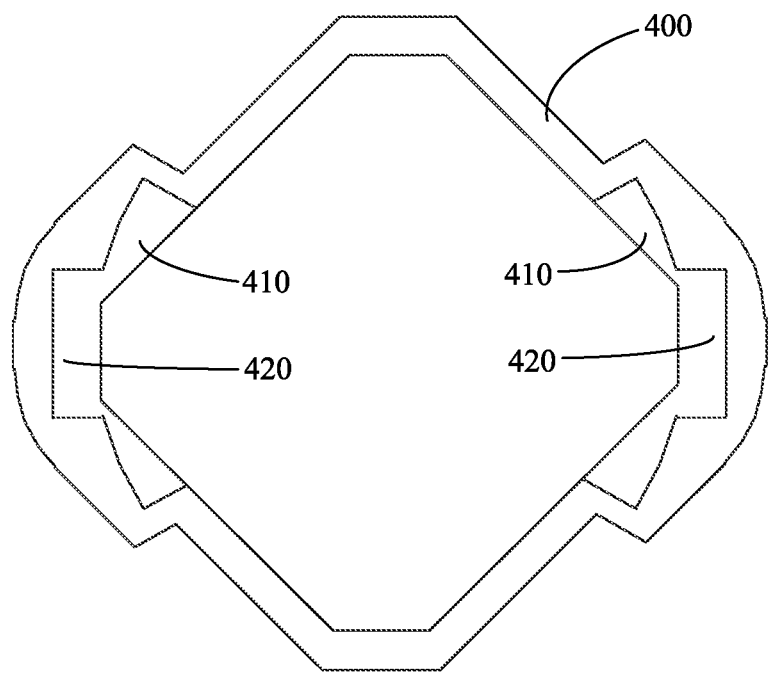

Reference signs are described as follows:

100. module housing; 110. inner housing chamber; 120. housing frame; 130. first cover plate; 131. second bypass hole; 140. second cover plate;

200. first bracket; 210. bracket body; 211. first bypass hole; 220. first connecting arm; 221. first hinge hole; 230. second connecting arm; 231. second hinge hole;

300. camera; 310. lens;

400. second bracket; 410. first depression; 420. second depression;

510. rolling-element bracket; 520. rolling element; 530. limiting protrusion;

610. first hinge shaft; 620. second hinge shaft;

700. flexible printed circuit board;

810. third bracket; 820. electromagnet.

DETAILED DESCRIPTION

To make the objectives, technical solutions, and advantages of this disclosure clearer, the following clearly describes the technical solutions of this disclosure with reference to specific embodiments of this disclosure and corresponding drawings. Apparently, the described embodiments are merely some rather than all the embodiments of this disclosure. All other embodiments that a person of ordinary skill in the art obtains without creative efforts based on the embodiments of this disclosure shall fall within the protection scope of this disclosure.

The technical solutions disclosed in the embodiments of this disclosure are described in detail below with reference to the accompanying drawings.

Referring to FIG. 1 to FIG. 9, an embodiment of this disclosure discloses a camera module, and the disclosed camera module may be applied to an electronic device. The disclosed camera module includes a module housing 100, a first bracket 200, a camera 300, a second bracket 400, and a rolling-element bracket 510.

The module housing 100 is a basic component of the camera module, and the module housing 100 can provide a foundation for installing other components of the camera module. In this embodiment of this disclosure, the module housing 100 has an inner housing chamber 110. The inner housing chamber 110 has an opening, and the opening serves as a bypass.

The first bracket 200 is at least partly disposed in the inner housing chamber 110, and the camera 300 is at least partly disposed in the inner housing chamber 110. The camera 300 can take shots through the opening of the inner housing chamber 110.

In this embodiment of this disclosure, the first bracket 200 is hinged to the module housing 100 by a first hinge shaft 610. The first bracket 200 can rotate around the first hinge shaft 610. The camera 300 is fixedly connected to the second bracket 400, and the rolling-element bracket 510 is disposed with a rolling element 520. The rolling element 520 may be a ball or a roller. The second bracket 400 is connected to the rolling element 520 in a rolling mode, to allow relative rolling between the rolling-element bracket 510 and the second bracket 400. Specifically, the camera 300 can rotate with the second bracket 400 around its lens axis by rolling.

The rolling-element bracket 510 is hinged to the first bracket 200 by a second hinge shaft 620, and the camera 300 and the second bracket 400 can rotate with the rolling-element bracket 510 around the second hinge shaft 620.

In this embodiment of this disclosure, an axis of the first hinge shaft 610 and an axis of the second hinge shaft 620 intersect or lie on different planes. The lens axis and the axis of the first hinge shaft 610 intersect or lie on different planes, and the lens axis and the axis of the second hinge shaft 620 intersect or lie on different planes. In other words, the rotating direction of the camera 300 and the second bracket 400 relative to the first bracket 200, the rotating direction of the first bracket 200 relative to the module housing 100, and the rotating direction of the camera 300 with the second bracket 400 relative to the rolling-element bracket 510 are different from each other.

In a specific shooting process, the camera module may tilt due to shaking, eventually affecting the photograph quality. In the camera module disclosed in this embodiment of this disclosure, the camera 300, the second bracket 400, and the first bracket 200 as a whole rotate around the first hinge shaft 610 relative to the module housing 100, and the camera 300 and the second bracket 400 as a whole rotate around the second hinge shaft 620 relative to the first bracket 200. Because the axis of the first hinge shaft 610 and the axis of the second hinge shaft 620 intersect or lie on different planes, rotations of the camera 300 in the above two directions can compensate for the angular components of the tilt in these two directions caused by shaking of the camera module, thereby implementing effective anti-shake for the camera module. When the camera 300 rotates around the axis of the first hinge shaft 610 or the axis of the second hinge shaft 620, the camera 300 is also able to rotate with the second bracket 400, thereby enabling the camera 300 to achieve a larger field of view for shooting.

In an optional solution, the axis of the first hinge shaft 610 may be perpendicular to the axis of the second hinge shaft 620. In this case, an inclination angle generated by shaking of the entire camera module during shooting is easily resolved into two angular components around the axis of the first hinge shaft 610 and around the axis of the second hinge shaft 620 respectively, thereby facilitating angle compensation for the camera 300 during rotation.

The first bracket 200 may have various structures. In an optional solution, the first bracket 200 may include a bracket body 210 and a first connecting arm 220, and a first end of the first connecting arm 220 is fixedly connected to the bracket body 210. A second end of the first connecting arm 220 is a free end. The first hinge shaft 610 may be fastened on the module housing 100, the second end of the first connecting arm 220 may be disposed with a first hinge hole 221, and the first hinge shaft 610 is hinged to the first hinge hole 221. The first connecting arm 220 is hinged to the module housing 100 by the first hinge shaft 610, helping reduce a space occupied by a hinge structure. In addition, the second end of the first connecting arm 220 is a free end, that is, the first connecting arm 220 is a cantilever structure. The second end of the first connecting arm 220 can extend into the inner housing chamber 110 to implement a hinged connection, helping miniaturize the entire camera module.

In an optional solution, the first bracket 200 may further include a second connecting arm 230, where a first end of the second connecting arm 230 is fixedly connected to the bracket body 210, and a second end of the second connecting arm 230 is a free end. The second end of the second connecting arm 230 is disposed with a second hinge hole 231, and the second hinge hole 231 is hinged to the second hinge shaft 620. Similarly, the second end of the second connecting arm 230 can extend into the inner housing chamber 110 to implement a hinged connection, helping miniaturize the entire module bracket. In addition, the second connecting arm 230 is a cantilever structure, and the second hinge hole 231 is disposed at the free end of the second connecting arm 230, so it is easier to implement a hinge assembly by deformation of the second connecting arm 230.

In an optional solution, to improve stability of the hinge, two such first connecting arm 220 and two such second connecting arm 230 may be provided. The two first connecting arms 220 may be arranged diagonally on both sides of the camera 300 respectively, that is, the two first connecting arms 220 may be symmetrically arranged on two sides of the camera 300 relative to the camera 300; and the two second connecting arms 230 may be arranged diagonally on two sides of the camera 300 respectively, that is, the two second connecting arms 230 may be symmetrically arranged on two sides of the camera 300 relative to the camera 300. The two first connecting arms 220 and the two second connecting arms 230 are evenly and alternately arranged on the peripheral side of the bracket body 210. In this case, each first connecting arm 220 can be hinged to one first hinge shaft 610, and each second connecting arm 230 can be hinged to one second hinge shaft 620, which can undoubtedly improve the balance of rotation support.

In this embodiment of this disclosure, the bracket body 210 is the main body part of the first bracket 200, and the bracket body 210 can ensure that the first connecting arm 220 and the second connecting arm 230 have a higher strength. The bracket body 210 may have various structures. In an optional solution, the bracket body 210 may be provided with a first bypass hole 211. A lens 310 of the camera 300 may be disposed opposite the first bypass hole 211, and the lens 310 of the camera 300 may take pictures through the first bypass hole 211.

Specifically, the lens 310 of the camera 300 may be completely located in the inner housing chamber 110, or may be located in the first bypass hole 211, or certainly, may extend out of the inner housing chamber 110 through the first bypass hole 211. In an optional solution, to prevent opening of the first bypass hole 211 from being excessively large, the lens 310 of the camera 300 is located in the first bypass hole 211 or extends out of the module housing 100 through the first bypass hole 211. In this case, it can be avoided that the opening of the first bypass hole 211 is too large under the same shooting field of view, or the above solution can undoubtedly achieve a larger shooting field of view of the lens 310 under a given opening size of the first bypass hole 211. Certainly, the lens 310 of the camera 300 needs the first bypass hole 211 to form a gap around the lens 310, and the gap allows the camera 300 to rotate in the rotating process of the camera 300.

In an optional solution, to facilitate manufacturing and assembly, the first bracket 200 may be an integral structure. Specifically, the first bracket 200 may be an integral metal structure.

Specifically, in a specific anti-shake process, the camera 300 needs to rotate around the axis of the first hinge shaft 610 and/or the axis of the second hinge shaft 620. The camera 300 can be driven to rotate in various ways.

In an optional solution, the electronic device disclosed in this embodiment of this disclosure may further include a drive mechanism, and the drive mechanism may include a permanent magnet and an electromagnet. Specifically, the electronic device may be configured with a drive mechanism that matches each movement direction. Various types of drive components may be used, for example, implementing direct driving by a drive motor, or implementing driving by a drive motor in cooperation with a transmission mechanism. In an optional solution, each drive component may include a permanent magnet and an electromagnet 820, and drive a movement by a magnetic force between the electromagnet and the permanent magnet after the electromagnet is electrified.

To facilitate assembly, the electromagnet 820 may be installed on a third bracket 810, and the third bracket 810 is disposed on the module housing 100. In this case, the permanent magnet is installed on a component capable of relative rotation. When the electromagnet 820 is electrified, the magnetic force generated by the electromagnet 820 and the permanent magnet can drive a corresponding component to rotate.

In this embodiment of this disclosure, the module housing 100 may have various structures. Still referring to FIG. 1, in a specific implementation, the module housing 100 may include a housing frame 120, a first cover plate 130, and a second cover plate 140. The first cover plate 130 is disposed on an opening at one end of the housing frame 120, the second cover plate 140 is disposed on an opening at the other end of the housing frame 120. The first cover plate 130, the second cover plate 140 and the housing frame 120 form the inner housing chamber 110. The first cover plate 130 is provided with a second bypass hole 131, and the second bypass hole 131 communicates with the inner housing chamber 110. The module housing 100 with the foregoing structure is assembly friendly, facilitating the installation of the camera 300. On the premise that the bracket body 210 is provided with the first bypass hole 211, the first bypass hole 211 is located in the space encompassed by the hole wall of the second bypass hole 131.

Referring to FIG. 6 to FIG. 9, in an optional solution, the second bracket 400 may be provided with a first depression 410, the rolling-element bracket 510 is disposed in the first depression 410, and the rolling element 520 is disposed between the rolling-element bracket 510 and the first depression 410. A first bypass gap is present between the rolling-element bracket 510 and a side wall of the first depression 410, and the rolling-element bracket 510 fits the side wall of the first depression 410 in a position limited manner in the rolling direction of the second bracket 400, so that the second bracket 400 can rotate relative to the rolling-element bracket 510 only within a given angle range, so as to implement a small angle adjustment of the shooting field of view.

To improve the ease of assembly, the second bracket 400 may be provided with a second depression 420, the second depression 420 communicates with the first depression 410, the rolling-element bracket 510 is provided with a limiting protrusion 530, and the limiting protrusion 530 extends into the second depression 420 through the first depression 410, and forms a second bypass gap with a side wall of the second depression 420. The limiting protrusion 530 fits the side wall of the second depression 420 in a position limited manner in the rolling direction of the second bracket 400. The first bypass gap has the same function as the second bypass gap, and both can implement the relative rolling of the second bracket 400 relative to the rolling-element bracket 510.

In an optional solution, to make the rolling more stable, at least two such rolling-element brackets 510 are provided. The rolling-element brackets 510 may be spaced apart in the rotating direction of the second bracket 400, and a rolling element 520 is disposed between each of the rolling-element brackets 510 and the second bracket 400.

Figure 8:
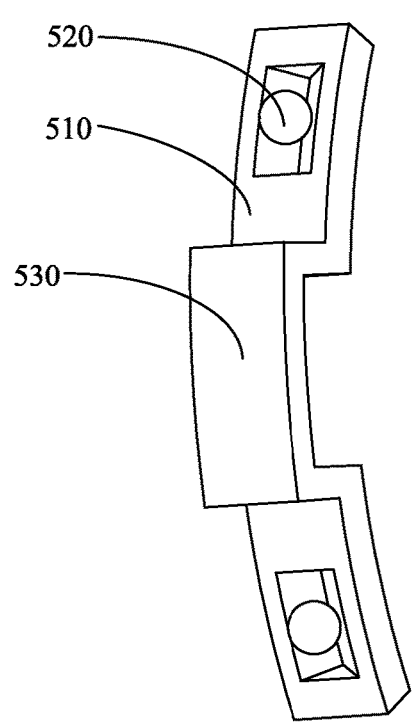
FIG. 8 and FIG. 9 are schematic structural diagrams of a second bracket under different viewing angles disclosed in the embodiments of this disclosure.
Figure 9:
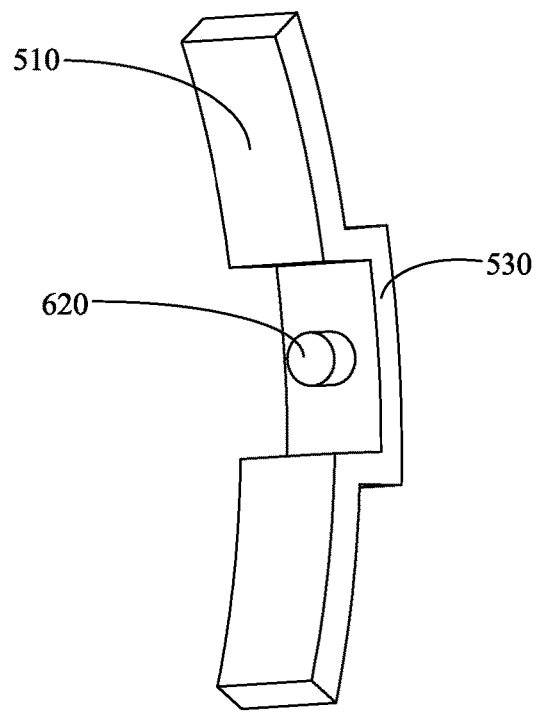

To facilitate assembly, the second hinge shaft 620 and the rolling-element bracket 510 may be an integral structure, as shown in FIG. 8 and FIG. 9, so as to implement an integral installation with fewer installation steps.

Based on the camera module disclosed in this embodiment of this disclosure, an embodiment of this disclosure discloses an electronic device, and the disclosed electronic device includes the camera module described above. The camera 300 can be electrically connected to the main board of the electronic device through a flexible printed circuit board 700 that runs through the module housing 100, thereby implementing power supply to the camera 300. The flexible printed circuit board 700 has a good ability to deform, and therefore can better adapt to the rotation of the camera 300.

The electronic device in this embodiment of this disclosure may be a smart phone, a tablet computer, an e-book reader, a wearable device, or the like. The embodiments of this disclosure do not limit the specific type of the electronic device.

The above embodiments of this disclosure focus on the differences between the embodiments. Provided that different features of improvement in the embodiments are not contradictory, they can be combined to form a more preferred embodiment. Further descriptions are omitted herein for the purpose of brevity.

The foregoing descriptions are only embodiments of this disclosure, but this disclosure is not limited to such embodiments. For a person skilled in the art, this disclosure may have various changes and variations. Any modification, equivalent replacement, and improvement made without departing from the spirit and principle of this disclosure shall fall within the protection scope of the claims of this disclosure.

What is claimed is:

1. A camera module, comprising a module housing, a first bracket, a camera, a second bracket and a rolling-element bracket, wherein
   the module housing has an inner housing chamber;
   the first bracket is at least partly disposed in the inner housing chamber, the camera is at least partly disposed in the inner housing chamber, the first bracket is hinged to the module housing by a first hinge shaft, and the first bracket is able to rotate around the first hinge shaft;
   the first bracket comprises a bracket body, the bracket body is provided with a first bypass hole, and a lens of the camera takes pictures through the first bypass hole;
   the camera is fixedly connected to the second bracket, the rolling-element bracket is disposed with a rolling element, the second bracket is connected to the rolling element in a rolling mode, the camera is able to rotate with the second bracket around a lens axis of the camera, the rolling-element bracket is hinged to the first bracket by a second hinge shaft, and the camera and the second bracket are able to rotate with the rolling-element bracket around the second hinge shaft; and the axis of the first hinge shaft and the axis of the second hinge shaft intersect or lie on different planes, the lens axis and the axis of the first hinge shaft intersect or lie on different planes, and the lens axis and the axis of the second hinge shaft intersect or lie on different planes.

2. The camera module according to claim 1, wherein the first bracket further comprises a first connecting arm and a second connecting arm, wherein one end of the first connecting arm is fixedly connected to the bracket body, the other end of the first connecting arm extends into the inner housing chamber and is hinged to the module housing by the first hinge shaft, one end of the second connecting arm is fixedly connected to the bracket body, and the other end of the second connecting arm extends into the inner housing chamber and is hinged to the rolling-element bracket by the second hinge shaft.

3. The camera module according to claim 2, wherein two first connecting arms and two second connecting arms are provided, and the camera is provided with four sides, wherein the two first connecting arms are arranged diagonally on two sides of the camera respectively, and the two second connecting arms are arranged diagonally on the other two sides of the camera respectively.

4. The camera module according to claim 2, wherein the first bracket is an integral structure.

5. The camera module according to claim 1, wherein the axis of the first hinge shaft is perpendicular to the axis of the second hinge shaft.

6. The camera module according to claim 1, wherein the module housing comprises a housing frame, a first cover plate and a second cover plate, the housing frame is provided with two ends, the first cover plate is disposed on an opening at one end of the housing frame, the second cover plate is disposed on an opening at the other end of the housing frame, the first cover plate, the second cover plate and the housing frame form the inner housing chamber, the first cover plate is provided with a second bypass hole, and the second bypass hole communicates with the inner housing chamber.

7. The camera module according to claim 1, wherein the second bracket is provided with a first depression, and the rolling-element bracket is disposed in the first depression, the rolling element is disposed between the rolling-element bracket and the first depression, a first bypass gap is present between the rolling-element bracket and a side wall of the first depression, and the rolling-element bracket fits the side wall of the first depression in a position limited manner along the rolling direction of the second bracket.

8. The camera module according to claim 7, wherein the second bracket is provided with a second depression, the second depression communicates with the first depression, the rolling-element bracket is provided with a limiting protrusion, and the limiting protrusion extends into the second depression through the first depression, and forms a second bypass gap together with a side wall of the second depression, and the limiting protrusion fits the side wall of the second depression in a position limited manner along the rolling direction of the second bracket.

9. The camera module according to claim 1, wherein at least two such rolling-element brackets are provided, and the rolling-element brackets are spaced apart in the rotating direction of the second bracket, the rolling element is disposed between each of the rolling-element brackets and the second bracket.

10. The camera module according to claim 1, wherein the second hinge shaft and the rolling-element bracket are an integral structure.

11. An electronic device, comprising a camera module, wherein the camera module comprises:
a module housing, a first bracket, a camera, a second bracket and a rolling-element bracket, wherein
the module housing has an inner housing chamber;
the first bracket is at least partly disposed in the inner housing chamber, the camera is at least partly disposed in the inner housing chamber, the first bracket is hinged to the module housing by a first hinge shaft, and the first bracket is able to rotate around the first hinge shaft;
the first bracket comprises a bracket body, the bracket body is provided with a first bypass hole, and a lens of the camera takes pictures through the first bypass hole;
the camera is fixedly connected to the second bracket, the rolling-element bracket is disposed with a rolling element, the second bracket is connected to the rolling element in a rolling mode, the camera is able to rotate with the second bracket around a lens axis of the camera, the rolling-element bracket is hinged to the first bracket by a second hinge shaft, and the camera and the second bracket are able to rotate with the rolling-element bracket around the second hinge shaft; and
the axis of the first hinge shaft and the axis of the second hinge shaft intersect or lie on different planes, the lens axis and the axis of the first hinge shaft intersect or lie on different planes, and the lens axis and the axis of the second hinge shaft intersect or lie on different planes.

12. The electronic device according to claim 11, wherein the first bracket further comprises a first connecting arm and a second connecting arm, wherein one end of the first connecting arm is fixedly connected to the bracket body, the other end of the first connecting arm extends into the inner housing chamber and is hinged to the module housing by the first hinge shaft, one end of the second connecting arm is fixedly connected to the bracket body, and the other end of the second connecting arm extends into the inner housing chamber and is hinged to the rolling-element bracket by the second hinge shaft.

13. The electronic device according to claim 12, wherein two first connecting arms and two second connecting arms are provided, and the camera is provided with four sides, wherein the two first connecting arms are arranged diagonally on two sides of the camera respectively, and the two second connecting arms are arranged diagonally on the other two sides of the camera respectively.

14. The electronic device according to claim 12, wherein the first bracket is an integral structure.

15. The electronic device according to claim 11, wherein the axis of the first hinge shaft is perpendicular to the axis of the second hinge shaft.

16. The electronic device according to claim 11, wherein the module housing comprises a housing frame, a first cover plate and a second cover plate, the housing frame is provided with two ends, the first cover plate is disposed on an opening at one end of the housing frame, the second cover plate is disposed on an opening at the other end of the housing frame, the first cover plate, the second cover plate and the housing frame form the inner housing chamber, the first cover plate is provided with a second bypass hole, and the second bypass hole communicates with the inner housing chamber.

17. The electronic device according to claim 11, wherein the second bracket is provided with a first depression, and the rolling-element bracket is disposed in the first depression, the rolling element is disposed between the rolling-element bracket and the first depression, a first bypass gap is present between the rolling-element bracket and a side wall of the first depression, and the rolling-element bracket fits the side wall of the first depression in a position limited manner along the rolling direction of the second bracket.

18. The electronic device according to claim 17, wherein the second bracket is provided with a second depression, the second depression communicates with the first depression, the rolling-element bracket is provided with a limiting protrusion, and the limiting protrusion extends into the second depression through the first depression, and forms a second bypass gap together with a side wall of the second depression, and the limiting protrusion fits the side wall of the second depression in a position limited manner along the rolling direction of the second bracket.

* * * * *